United States Patent
Gordon

(10) Patent No.: US 9,627,809 B2
(45) Date of Patent: Apr. 18, 2017

(54) LAND GRID ARRAY SOCKET FOR ELECTRO-OPTICAL MODULES

(71) Applicant: Intel Corporation, Santa Clara, CA (US)

(72) Inventor: Glen Gordon, Graham, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/127,534

(22) PCT Filed: Sep. 13, 2013

(86) PCT No.: PCT/US2013/059750
§ 371 (c)(1),
(2) Date: Dec. 19, 2013

(87) PCT Pub. No.: WO2015/038149
PCT Pub. Date: Mar. 19, 2015

(65) Prior Publication Data
US 2015/0079832 A1    Mar. 19, 2015

(51) Int. Cl.
*H01R 13/6582* (2011.01)
*H01R 12/83* (2011.01)
(Continued)

(52) U.S. Cl.
CPC ......... *H01R 13/629* (2013.01); *G02B 6/4284* (2013.01); *H01R 4/48* (2013.01);
(Continued)

(58) Field of Classification Search
CPC ...... H01R 12/83; H01R 12/72; H01R 13/629; H01R 4/48; H01R 12/70; H01R 43/205;
(Continued)

(56) References Cited

U.S. PATENT DOCUMENTS 5,425,651 A * 6/1995 Thrush et al. ................ 439/326
6,234,820 B1   5/2001 Perino et al.
(Continued)

FOREIGN PATENT DOCUMENTS

CN    101911391     12/2010
JP    2008-235434 A 10/2008

OTHER PUBLICATIONS

International Search Report and Written Opinion received for PCT Patent Application No. PCT/US2013/059750, mailed on Apr. 30, 2014, 11 Pages.
(Continued)

*Primary Examiner* — Felix O Figueroa
*Assistant Examiner* — Paul Baillargeon
(74) *Attorney, Agent, or Firm* — Green, Howard & Mughal, LLP

(57) ABSTRACT

An LGA socket suitable for electro-optical modules, such as transceivers having channels operable at 25 Gbit/s, or greater. A socket may include a socket body having a bottom side to face a printed circuit board (PCB), and a backstop on a top side to receive a leading edge of a module substrate. The backstop has an overhang to contact a first side of the module substrate when seated into the socket body. The socket further includes a first and a second row of electrical contacts, the first row being more proximate to the backstop than is the second row. Contacts extend through the socket body between the top and bottom sides and are positioned relative to the overhang to be compressed against contact pads on a second side of the module substrate by a torque applied to the module substrate about a fulcrum within the socket body.

16 Claims, 10 Drawing Sheets

(51) Int. Cl.
   *H01R 13/629* (2006.01)
   *H01R 4/48* (2006.01)
   *H01R 12/70* (2011.01)
   *H01R 43/20* (2006.01)
   *G02B 6/42* (2006.01)

(52) U.S. Cl.
   CPC ......... *H01R 12/70* (2013.01); *H01R 13/6582* (2013.01); *H01R 43/205* (2013.01); *H01R 12/83* (2013.01); *Y10T 29/49147* (2015.01)

(58) Field of Classification Search
   CPC .............. H01R 13/6582; G02B 6/4284; Y10T 29/49147
   USPC .... 439/607.14, 607.31, 59, 68–73, 330–331, 439/325–327
   See application file for complete search history.

(56) References Cited

U.S. PATENT DOCUMENTS

| | | | |
|---|---|---|---|
| 6,280,222 B1 | 8/2001 | Walkup | |
| 6,340,307 B1 * | 1/2002 | Sugita | 439/326 |
| 6,767,252 B2 * | 7/2004 | McGrath et al. | 439/637 |
| 7,300,298 B2 * | 11/2007 | Kameda | H01R 12/83 439/326 |
| 7,924,558 B2 * | 4/2011 | Crippen et al. | 361/679.4 |
| 8,202,126 B2 * | 6/2012 | Lim | 439/636 |
| 8,317,542 B2 * | 11/2012 | Abraham | 439/607.31 |
| 8,363,410 B2 * | 1/2013 | Kobori et al. | 361/719 |
| 8,696,388 B2 * | 4/2014 | Gao | H01R 12/721 439/607.19 |
| 8,944,850 B2 * | 2/2015 | Simmel | H01R 43/20 439/607.55 |
| 2002/0081882 A1 | 6/2002 | Lai et al. | |
| 2004/0082204 A1 | 4/2004 | Ma | |
| 2010/0248549 A1 | 9/2010 | Lim | |
| 2013/0188963 A1 * | 7/2013 | Afriat et al. | 398/135 |

OTHER PUBLICATIONS

Application Specification, 67 Positions 0.5 Pitch M.2(NGFF) Minicard 114-115006 22JAN13 Rev. A (8 pages).
International Preliminary Report on Patentability for International Patent Application No. PCT/US13/59750 mailed Mar. 24, 2016, 8 pages.
Office Action for Chinese Patent Application No. 201380079112.4 mailed Sep. 6, 2016, 10 pages—No Translation Available.

* cited by examiner

LAND GRID ARRAY SOCKET FOR ELECTRO-OPTICAL MODULES

TECHNICAL FIELD

Embodiments of the invention are generally related to integrated circuit (IC) module sockets, and more particularly pertain to land grid array (LGA) sockets for electro-optical modules.

BACKGROUND

A photonic integrated circuit (PIC) is useful as an optical data link in applications such as optical communications, high performance computing, and data centers. For mobile computing platforms too, a PIC is a promising input/output (I/O) for rapidly updating or syncing a mobile module with a host module and/or cloud service where a wireless link has insufficient bandwidth. Such optical links utilize an optical I/O interface that may include an electro-optical module including an optical transmitter and/or an optical receiver (e.g., a transceiver) operable at channel data rates of 25 Gbit/sec, or more.

An electro-optical transceiver IC may be mechanically and electrically coupled to a printed circuit board (PCB) with a socket, such as a land grid array (LGA) socket. Socketed transceiver architectures advantageously enable a host module to be upgraded over time. For example, a platform lacking optical link capability but including the appropriate socket can be subsequently upgraded by installing a transceiver into the socket. Or, a platform including an optical link having a transceiver with first channel data rates may be subsequently swapped for another with higher rates if compatible with the same socket. Most LGA sockets however require external load generation to compress the electrical contacts in the socket against contact pads on the IC. This load scales with number of contacts and methods to generate the load may be complicated by the spatial distribution of the contact pads over the IC. Typical load generation mechanisms include screws and springs, the implementation of which may require significant overhead in terms of board area (footprint) and/or socket z-height. Therefor, such socket form factors may be problematic for compact platforms.

A socket that is capable of supporting a sufficient number of data channels at the high data rates of an electro-optical transceiver and has a small board footprint is therefore advantageous.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, reference labels have been repeated among the figures to indicate corresponding or analogous elements and the x-dimension is defined to be aligned with transverse widths of the socket, the y-dimension aligned with longitudinal lengths of the socket, and the z-dimension aligned perpendicular to a host PCB. In the figures.

DETAILED DESCRIPTION

Figure 1:
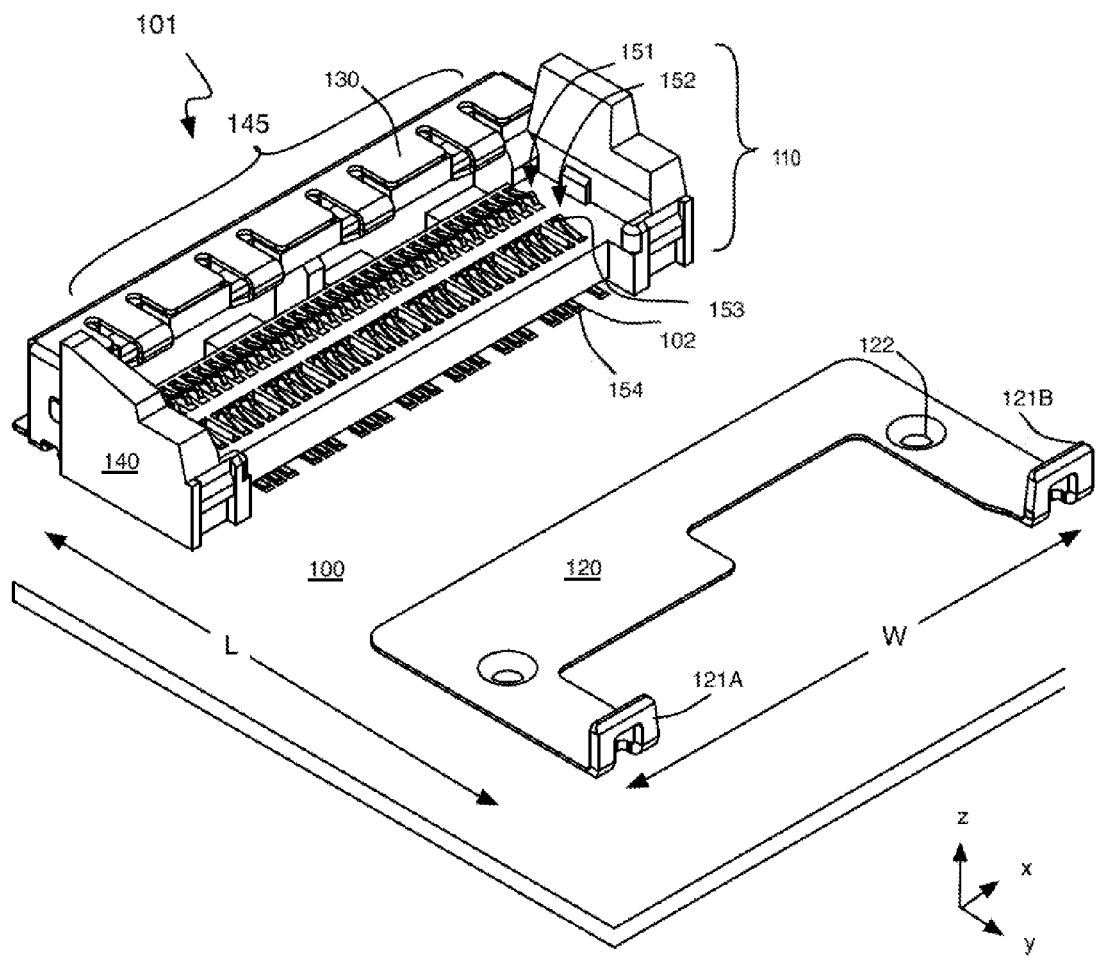
FIG. 1 is an isometric view of an IC module socket assembly, in accordance with an embodiment.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications other than what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. It should also be noted that directions and references, for example, up, down, top, bottom, and so on, may be used merely to facilitate the description of features in the drawings and are not intended to restrict the application of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that the present invention may be practiced without these specific details. In some instances, well-known methods and modules are shown in block diagram form, rather than in detail, to avoid obscuring the present invention. Reference throughout this specification to "an embodiment" or "one embodiment" means that a particular feature, structure, function, or characteristic described in connection with the embodiment is included in at least one embodiment of the invention. Thus, the appearances of the phrase "in an embodiment" or "in one embodiment" in various places throughout this specification are not necessarily referring to the some embodiment of the invention. Furthermore, the particular features, structures, functions, or characteristics may be combined at any suitable manner in one or more embodiments. For example, a first embodiment may be combined with a second embodiment anywhere the particular features, structures, functions, or characteristics associated with the two embodiments are not actually exclusive.

As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

The terms "over," "under," "between" and "on" as used hereto refer to a relative position of the component or material layer with respect to other components or layers where such physical relationships are noteworthy. For example in the context of material layers, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in direct contact with that second layer. Similar distinctions are to be made in the context of component assemblies.

As described in greater detail below, an LGA socket suitable for electro-optical modules, such as transceivers having I/O channels operable at 25 Gbit/s, or greater, may include a monolithic socket body having a bottom side to face a printed circuit board (PCB), and a backstop on a top side to receive a leading edge of a module substrate. The backstop has an overhang to contact a first side of the module substrate when seated into the socket body. The socket further includes a first and a second row of conductive electrical contacts. The first row is more proximate to the backstop than is the second row, and each row includes contacts extending through the socket body between the top and bottom sides. The contact rows are positioned relative to the overhang to be compressed against contact pads on a second side of the module substrate in response to a torque applied to the module substrate about a fulcrum within the socket body. A retention anchor may be disposed on the PCB (or on the socket body itself) on a side of the electrical contact rows opposite the backstop. The anchor is to affix to the IC module (e.g., module substrate) and to maintain an effort, as applied through the IC module, against the contacts and the overhang.

FIG. 1 is an isometric view of an IC module socket assembly 101, in accordance with an embodiment. In the exemplary embodiment, socket assembly 101 includes a socket 110 and a retention anchor 120, each of which is configured to be mounted on a host PCB 100. Socket 110 further includes a plurality of electrical contacts disposed in a socket body 140. In the exemplary embodiment, a first contact row 151 and a second contact row 152 extend along adjacent transverse widths of socket body 140. With both contact row 151 and 152 on a same side of socket 110, trace routing on an electro-optical transceiver module substrate may be optimized for highest bandwidth (e.g., utilizing transmission line architectures, etc.). Each contact row 151, 152 includes at least one electrical contact passing between top and bottom sides of socket body 140. With a bottom side of the socket body 140 facing PCB 100 and a top side of socket body 140 is to receive an IC module (not depicted). Each contact in contact rows 151, 152 has a PCB contact surface 154 that is to land on a contact pad 102 disposed on PCB 100. At an opposite end of PCB contact surface 154 is a module contact surface 153 that is to land on a contact pad disposed on a module substrate. Each contact row 151, 152 may include a great many contacts. In the exemplary embodiment illustrated where the socket 100 is to receive a four channel electro-optical transceiver module (e.g., a 4×25 Gb/sec module) each contact row 151, 152 includes about 30 contacts.

Socket body 140 is of a dielectric material to electrically isolate contacts from each other. In the exemplary embodiment, socket body 140 is a monolithic dielectric material machined or molded to have one or more of the structural features described elsewhere herein. While any dielectric material may be utilized, exemplary materials include thermo-plastics and polymers. More particularly, in one advantageous embodiment, socket body 140 is a glass filled liquid crystal polymer (LCP).

In embodiments, a module socket includes a backstop. The backstop is to extend a z-height above a top side surface where the contact pins reside and is to laterally position a module substrate relative to an electrical contact's module contact surface. Referring to FIG. 1, backstop 145 is disposed on a side of socket body 140 more proximate (i.e., nearer) to first contact row 151 than second contact row 152. Backstop 145 is to contact a leading edge of a module substrate and interfere with lateral translation of a module substrate along the longitudinal length of socket 110. In the exemplary embodiment, backstop 145 is monolithically integrated into socket body 140, although a similar structure and function may also be achieved with a discrete component affixed to the socket 110.

In embodiments, a socket further includes an overhang to contact a side of a module substrate opposite the contact contact pads when the module substrate is seated on the socket. The overhang may extend over the backstop and may further extend beyond the backstop a longitudinal distance toward the contact rows, as described further below. FIG. 1 illustrates as overhang 130 that is, at least in part, a discrete component, separate from socket body 140. In alternative embodiments, overhang 130 is monolithically integrated into socket body 140. In the exemplary embodiment, overhang 130 is on a side of backstop 140 opposite the contact rows such that a torque applied to the module substrate about a fulcrum on the backstop applies a counrterforce to overhang 130.

In embodiments, a socket assembly includes a retention anchor to provide at least a second attachment point between a module substrate and the PCB. One or more retention anchor is disposed on the PCB on a side of the electrical contacts opposite the backstop to retain a module substrate substantially parallel to a top surface of the socket body. The retention anchor(s) are under tensile stress and exert an "effort" force through the module substrate against the electrical contacts and the socket overhang. A retention anchor may take many forms, such as any permanent PCB mount that may utilize an interference fit, screw, etc. Furthermore, the retention anchor may be integrated into the socket body if the socket body has sufficient footprint. However, a discrete anchor affixed to the PCB separately from the socket advantageously reduces the total PCB footprint of socket assembly 101. Referring still to FIG. 1, retention anchor 120 is disposed on PCB 100 on a side of the electrical contact rows 151, 152 opposite backstop 145. Retention anchor 120 further includes at least one module anchor point 121A, which is to physically connect to a complementary anchor point on an IC module (e.g., on the IC module substrate). The module anchor point advantageously has positive module positioning, for example with latching surfaces or stops that ensure the module substrate is disposed at a predetermined z-height relative to PCB 100 for proper loading of the electrical contacts. In the exemplary embodiment, retention anchor 120 includes a pair of module anchor points 121A, 121B to affix to an IC module (e.g., module substrate) at two points a same longitudinal length L from backstop 145 and spaced apart by a transverse width W. Length L and width W are a function of the size of the module substrate to be loaded into socket assembly 101. In embodiments, length L is at least 50% of the longitudinal length of the module substrate. In further embodiments, width W is at least 50% of the transverse width of the module substrate. In advantageous embodiments, at least one of the length L or width W is substantially equal to the longitudinal or transverse width of the module substrate, respectively, to provide access to the anchor points while a module is installed. In the exemplary embodiment, anchor points 121A, 121B are keepers configured to mate with complementary latches included in a module to be loaded into socket assembly 101. Alternatively, anchor points 121A, 121B may be latches configured to mate with complementary keepers included in a module. In embodiments having multiple module anchor points, retention anchor 120 is advantageously aligned to PCB 100 with alignment features 122, for example squaring module anchor points 121A, 121B with backstop 145 that is similarly aligned to PCB 100. In the exemplary embodiment, alignment features 122 are bosses or posts to mate with divots or holes in PCB 100. In embodiments, retention anchor 120 is a metal, such as a single piece of stamped steel. In certain metal retention anchor 120 embodiments, retention anchor 120 is soldered to PCB 100, for example using surface mount technology (SMT). In other embodiments, retention anchor 120 is a dielectric, such as a thermoset plastic, LCP, etc., and bonded to PCB 100 by epoxy or other conventional adhesives.

Figure 2A:
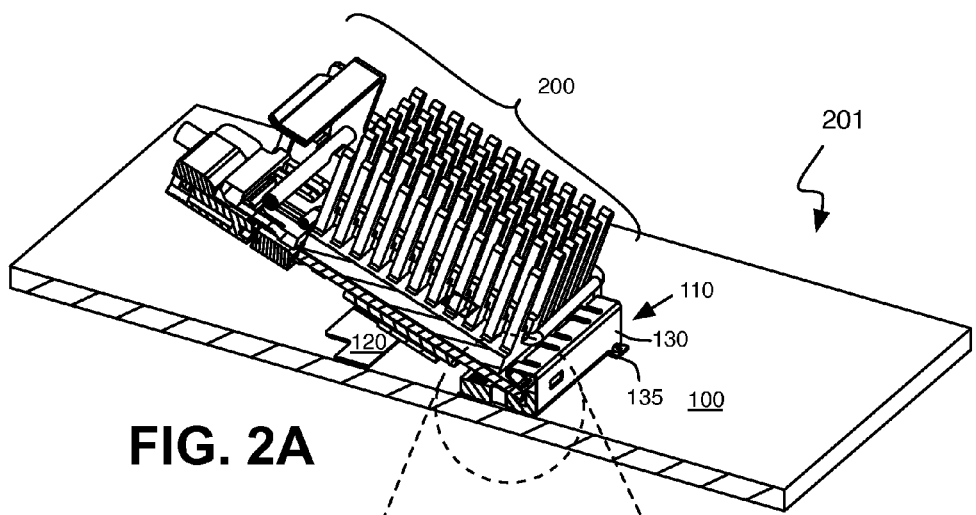
FIG. 2A is a sectional isometric view of the socket assembly in FIG. 1 receiving an electro-optical transceiver module, in accordance with an embodiment.
Figure 2B:
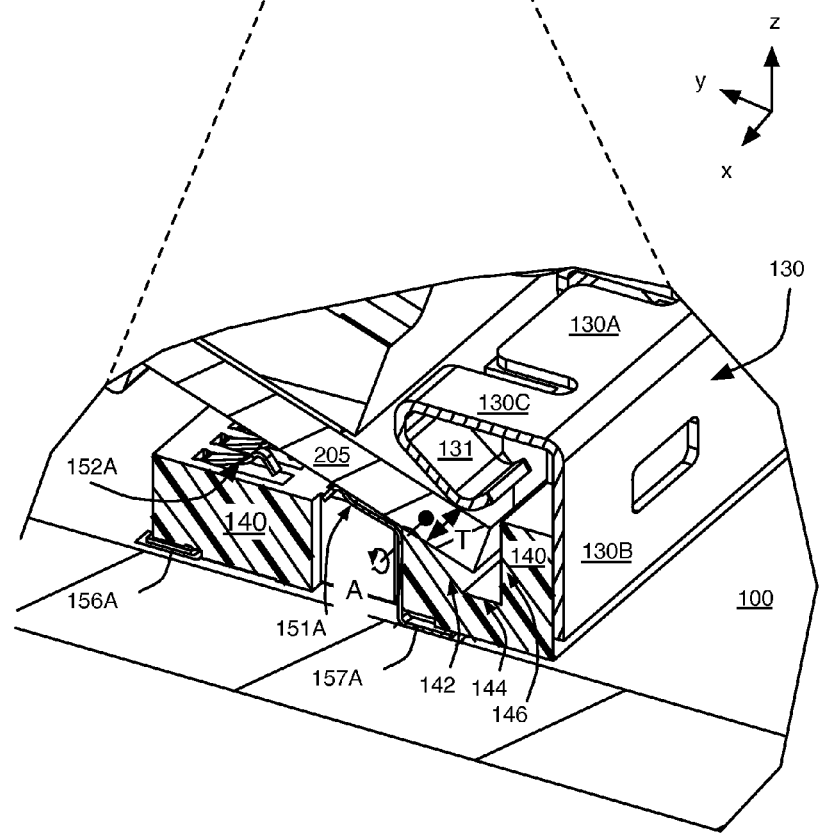
FIG. 2B is an expanded view of a region in the sectional isometric view of FIG. 2A.

FIG. 2A is a sectional isometric view of socket 110 receiving an electro-optical transceiver module 200, in accordance with an embodiment. FIG. 2B is an expanded view of the sectional isometric view in FIG. 2A further illustrating insertion of module 200. In state depicted in FIG. 2A, module 200 is inserted into socket 110, but does not fully contact all contacts, and not yet anchored by retention anchor 120. As shown in FIG. 2A, overhang 130 is connected to an anchor point 135. In the exemplary embodiment where overhang 130 is metal (e.g., stamped steel), anchor point 135 is solderable to a pad on PCB 100. In further embodiments, overhang 130 may be electrically connected to a ground plane on PCB 100 through solderable anchor point 135, for example to provide EMI shielding and/or to couple to a ground plane of module 200.

As further shown in FIG. 2B, overhang 130 abuts overhang and backstop surfaces of socket body 140. Overhang 130 includes an overhang top side 130A, disposed against a top side of socket body 140, and an overhang front side 130B disposed against a front side of socket body 140. Overhang 130 further includes a metallic spring clip 130C having an under-hanging clip member 131. Under-hanging clip member 131 is to make contact with a top side of module substrate 205. In the exemplary embodiment, under-hanging clip member 131 forms as acute angle with overhang top side 130A. Under-hanging clip member 131 and/or overhang top side 130A may be strained relative to overhang front side 130B as a torque is applied to under-hanging clip member 131 by module substrate 205.

Socket body 140 further includes a ramp 142 declining from a first ramp end nearer contact 151A to a second ramp end nearer backstop clearance 146. Ramp 142 may have a declining slope approximately parallel to that of under-hanging clip member 131 and is spaced below the under-hanging clip member 131 by a distance T sufficient to accept the leading edge of module substrate 205. Ramp 142 extends down to a bottom clearance 144, which along with sufficient clearance 146 allows the leading edge of module substrate 205 to freely rotate along a transverse axis A through module substrate 205 against a socket fulcrum. Substrate 205 may function as a class 2 lever, which rotates against overhang 130 to compress contacts 151A, 152A, contacting first contact 151A at a first module substrate location, and then contacting contact 152A at a second module substrate location. With under-hanging clip member 131 contacting an opposite side of module substrate 205 at a point between the socket fulcrum and module substrate leading edge, strain in under-hanging clip member 131, and/or overhang 130, provides a counterforce to keep the substrate leading edge from camming off of the socket fulcrum and also serves to elevate the trailing substrate edge in the manner shown in FIG. 2A when the module is not further anchored to the PCB by the retention anchor.

As also shown in FIG. 2B, contacts 151A, 152A are cantilevered from PCB contact pads 156A, 157A. When bonded to a PCB, the contacts will thereby provide a spring force opposing the torque applied to module substrate 205 such that a proper contact load may be applied against the contact pads on module substrate 205. In the exemplary embodiment, contact 151A is cantilevered away from overhang 130, while contact 152A is cantilevered in the opposite direction, toward overhang 130. Thus, as shown in FIG. 1, contacts in contact row 151 have PCB contact surfaces 154 proximate to backstop 145, and module substrate contact surfaces 153 distal from backstop 145. Contacts in contact row 152 have PCB contact surfaces 154 distal from backstop 145, and module substrate contact surfaces 153 proximate to backstop 145. This opposing cantilever contact architecture both minimizes the differential force applied against contacts in the different rows, since the substrate contact surfaces are in close proximity. PCB pitch requirements are also relaxed because the PCB contact pads 156A, 157A are further separated by the lateral lengths of the contact cantilevers.

Figure 3:
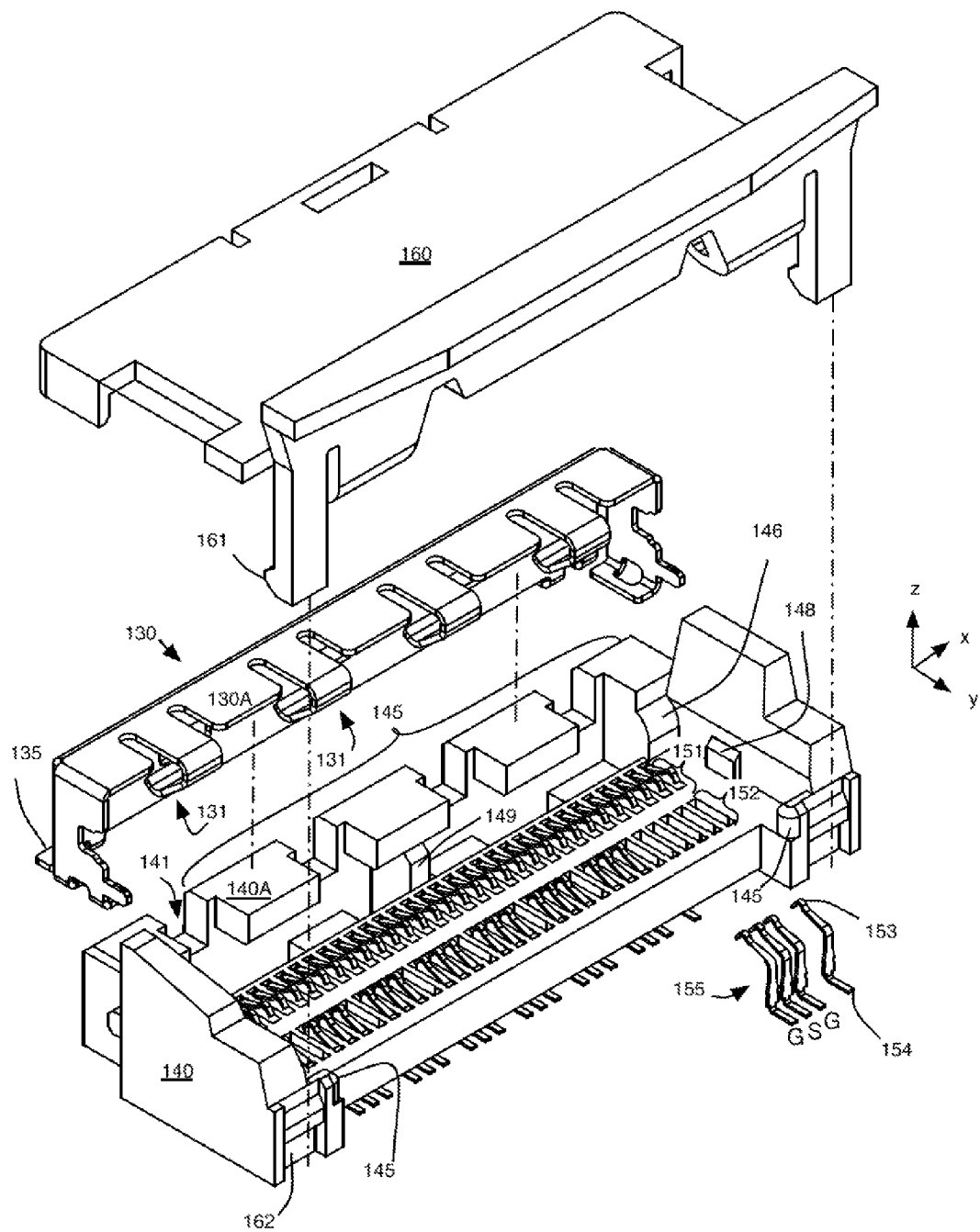
FIG. 3 is an exploded isometric view of the socket assembly depicted in FIG. 1 and further including a shroud, in accordance with an embodiment.

FIG. 3 is an exploded isometric view of the socket 110 further including a shroud 160, in accordance with an embodiment. As illustrated, electrical contacts in at least one of the contact rows are arranged into a plurality of groups 155. Each group 155 includes three contests arranged into a ground (G)-signal (S)-ground (G) configuration. Adjacent groups 155 are spaced apart by a greater lateral spacing than is between adjacent contacts within one group 155. In the exemplary embodiment therefore, contact row 152 comprises a plurality G-S-G groups enabling high bandwidth data signal channels (e.g., 2.5 Gbit/sec). Electrical contacts in contact row 151 carry or carry lower-speed data channels and are therefore more equally spaced apart and separated from contacts in contact row 151.

FIG. 3 further illustrates features in socket body 140, including a backstop chamfer surface 146 proximate to a contact at a first end of a contact row (e.g., first contact). Although not visible in FIG. 3, a second substantially identical backstop chamfer surface is disposed at the opposite edge of the socket body, proximate to a contact at a second end of the contact row (e.g., last contact). Backstop chamfer surface 146 is radiused about an axis substantially parallel with contact rows 151, 152 to maintain contact with the module substrate leading edge as the substrate is rotated about the fulcrum axis. The chamfer surface 146 may permit the leading edge to slide down from an inclined position to a position substantially parallel with a top surface of socket body 140 and in proper longitudinal alignment to make contact with the contact rows. In embodiments, socket body 140 further includes opposing lateral self-alignment features 148 at opposite edges of the socket body. As the module is rotated about the fulcrum, lateral self-alignment features 148 are to translate a module substrate in a transverse direction until centered about a center key 149 disposed at the transverse center of backstop 145. Center key 149 is to engage a complementary keyway, for example at a transverse center of a module substrate. Socket body 140 further includes backstop reliefs 141 to provide clearance for each under-hanging clip member 131. Between backstop reliefs 141 are overhang supports 140A. Supports 140A may assist with snap-fitting overhang 130 to socket body 140 against a tensile strain imposed between overhang top surface 130A and overhang front surface 130B (visible in FIG. 2B). In further embodiments, socket body 140 includes at least one key 145 that is to receive a complementary keyway along a longitudinal edge of a device module when the substrate is approximately parallel to socket body 140. In the exemplary embodiment, a pair of keys 145 is monolithically integrated into opposite ends of socket body 140 proximate to first and last contacts in contact row 152. Key(s) 145 may assist with lateral alignment along y-axis, seating into the device module substrate keyway only when the module substrate is in proper contact with backstop chamber 145. Key(s) 145 may further limit lateral translation of a module substrate along the longitudinal (y-axis) direction (e.g., away from backstop 145) when seated in the socket. Of course, key 145 and complementary keyway may be swapped between socket body 140 and a device module substrate from that depicted in FIGS. 3 and 4B to achieve a similar function.

As further depicted in FIG. 3, overhang 130 includes a plurality of separate spring clips, each with an under-hanging clip member 131, across the transverse width. Each under-hanging clip member forms approximately a same acute angle with a top surface of the overhang to contact the first module substrate side at separate points along a width of the module.

Shroud 160 includes latches 161 that engage keepers 162 and is seated over socket 110 and may protect contacts when the socket not in use (i.e., not loaded with a device module). Shroud 160 may also serve as a "pick and place" cap. The machine used to place the socket on the PCB, just prior to SMT oven reflow, uses the flat surface area on top of the 106 to "pick" up the socket using a vacuum then subsequently "place" the socket on the PCB. Without shroud 106, there may be insufficient surface area for adequate vacuum seal. In the exemplary embodiment, shroud 160 is to be removed prior to seating a device module into socket 110. While a device module is in the socket, shroud 160 is not installed. For such embodiments, shroud 160 may be any material, such as but not limited to metals or dielectrics (e.g. LCP, etc.). In alternative embodiments where shroud 160 is to further provide EMI shielding, shroud 160 is a metal and is to remain installed while a device module is in the socket.

Figure 4A:
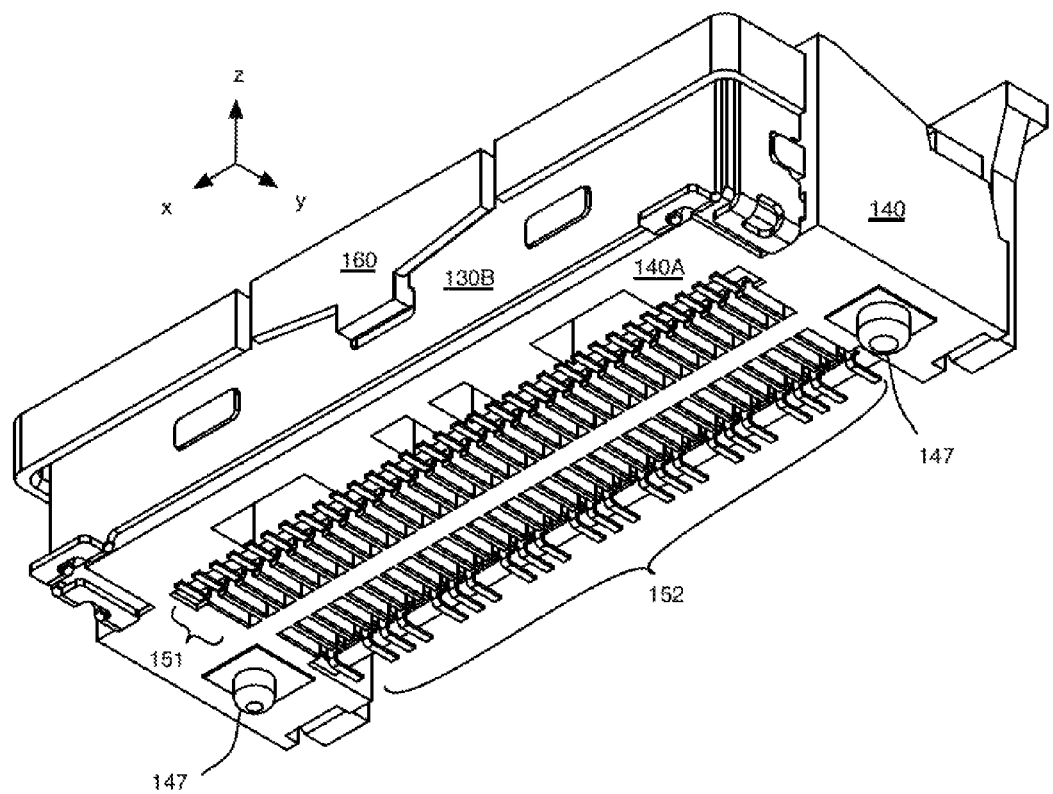
FIG. 4A is an isometric view of a bottom side of the socket depicted in FIG. 1, in accordance with an embodiment.
Figure 4B:
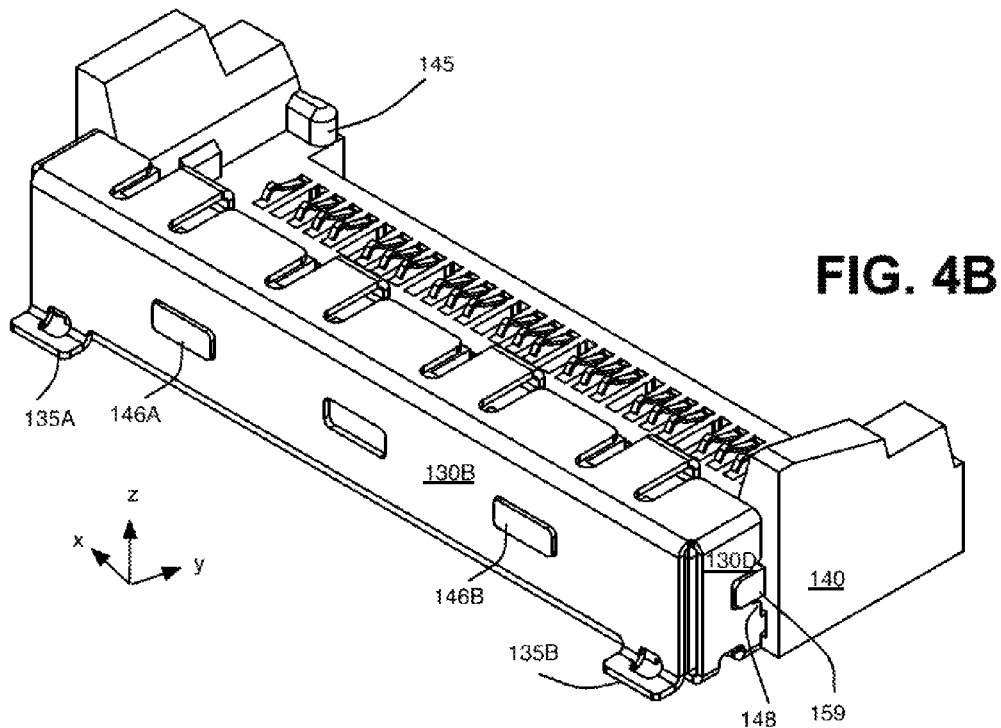
FIG. 4B is another isometric view of the socket body depicted in FIG. 1A, in accordance with an embodiment.

FIG. 4A is as isometric view of a board side of socket 110, in accordance with an embodiment. FIG. 4B is another isometric view of socket 110, in accordance with an embodiment. As shown in FIG. 4A, the socket body bottom side 140A is to face a PCB. PCB positioning/alignment features 147 are disposed at either end of contact row 152. Also visible in FIG. 4A is shroud 160, as latched into a keeper formed in overhang front surface 130B. FIG. 4 further illustrates bosses 146A, 146B in socket body 140 that mate with openings in overhang front surface 130B for the snap-fitting. Similarly, a key way 148 mates with a key 159 in socket body 140. A pair of solderable overhang anchor points 135A, 135B may be latched into a PCB feature and/or simply soldered to the PCB.

Figure 5:
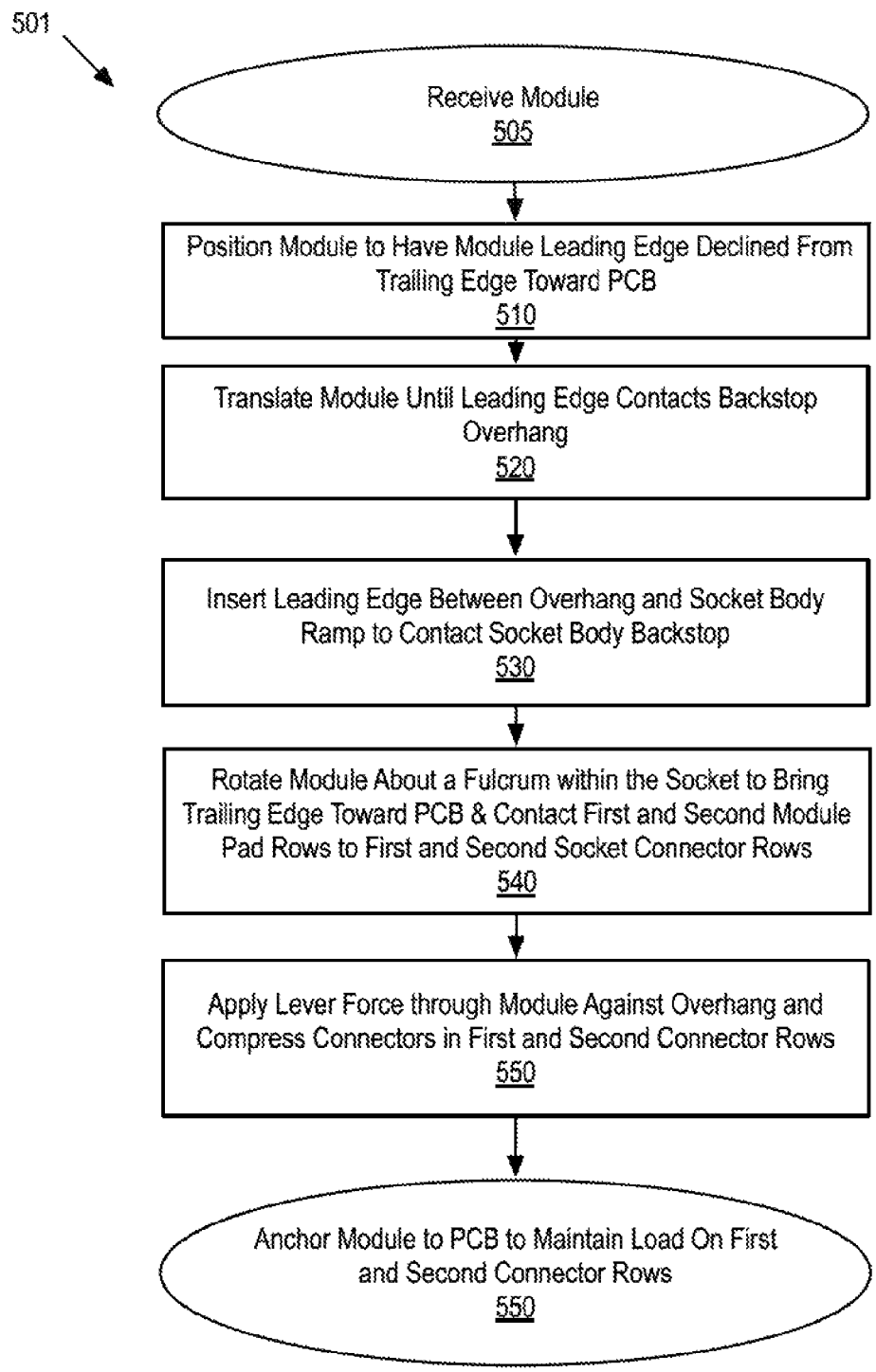
FIG. 5 is a flow diagram illustrating a method of installing an electro-optical transceiver module into the socket assembly depicted in FIG. 1, in accordance with an embodiment.
Figure 6A:
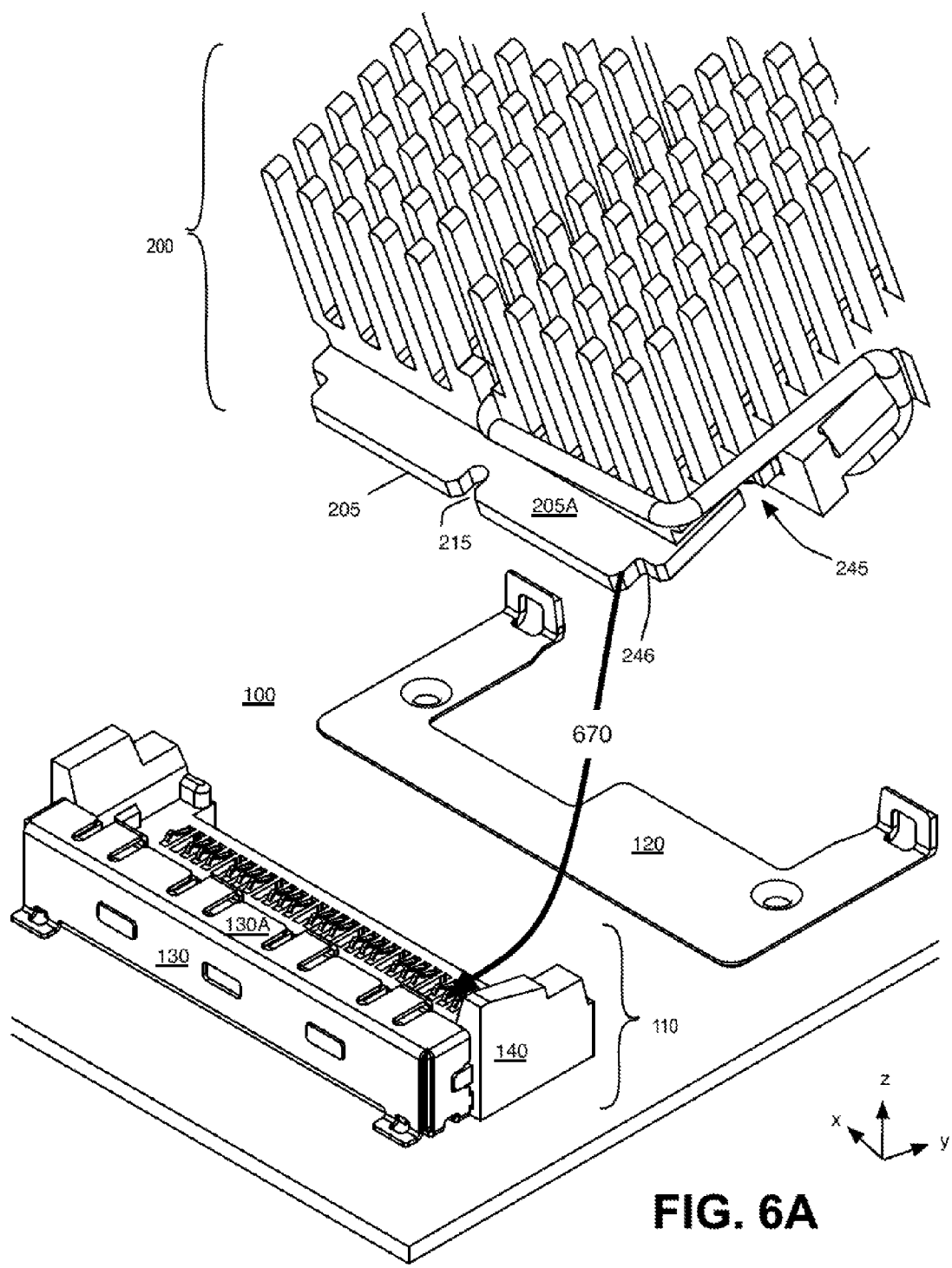
FIGS. 6A, 6B, and 6C are isometric views illustrating an electro-optical module as it is installed into the socket assembly depicted in FIG. 1 following the method illustrated in FIG. 5, in accordance with an embodiment.
Figure 6B:
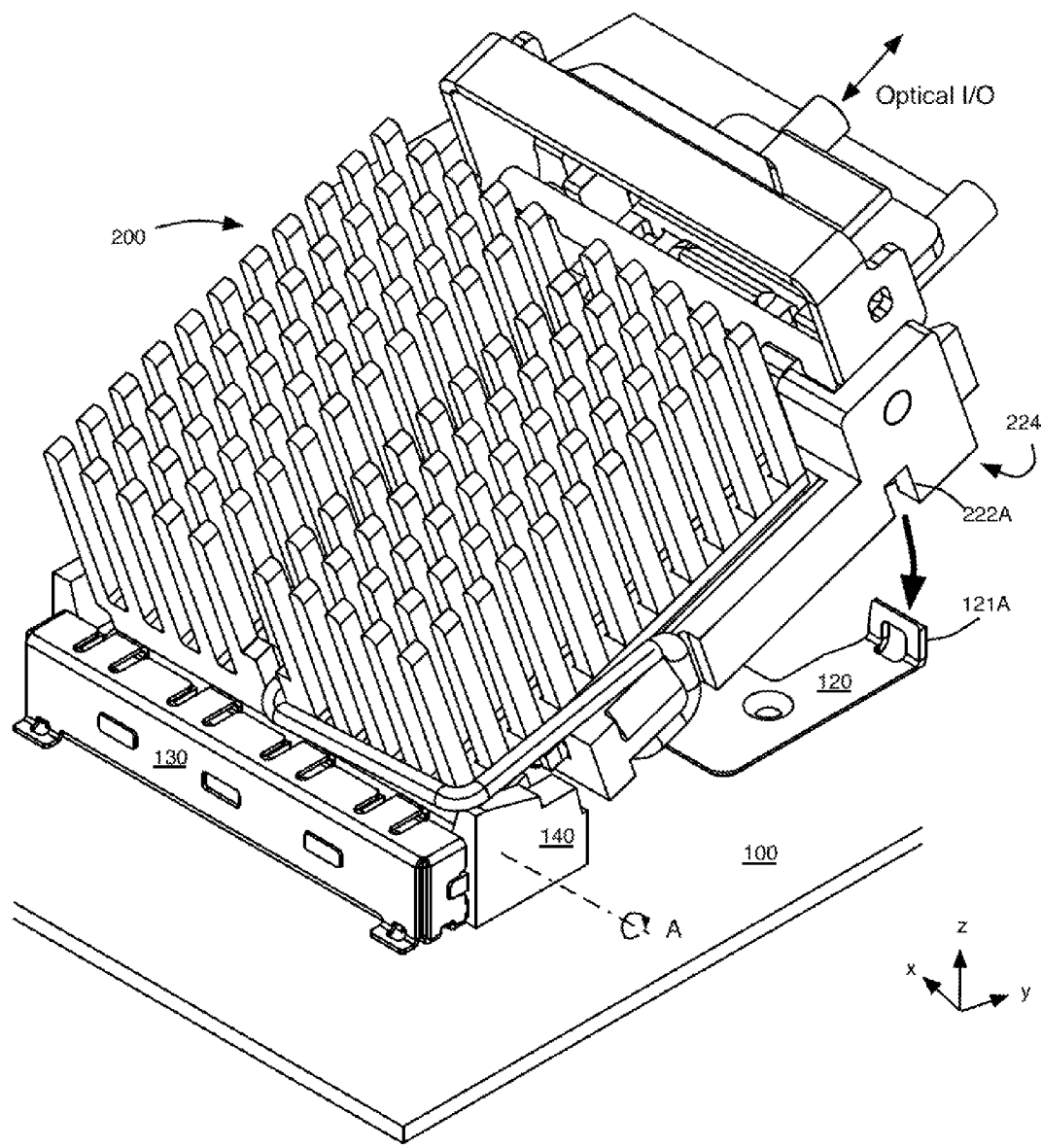
Figure 6C:
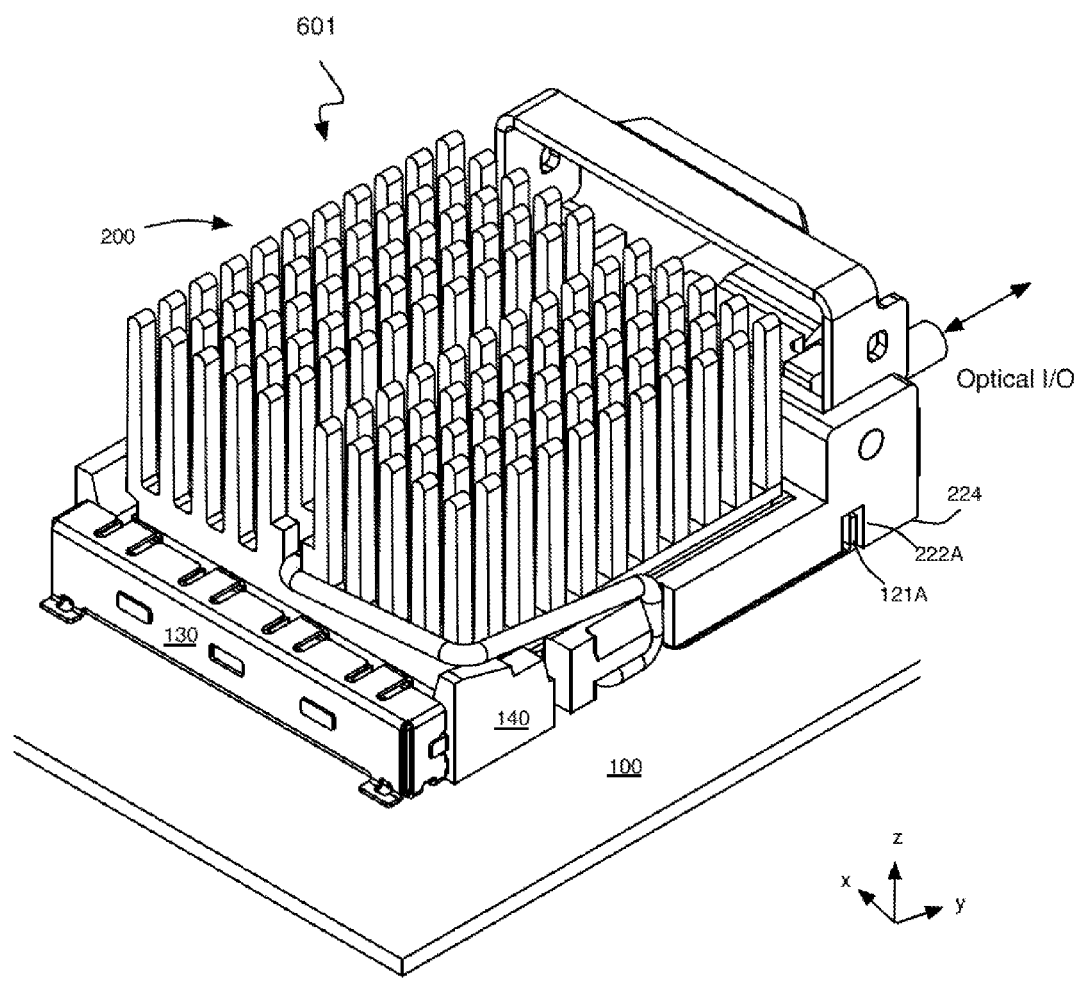

FIG. 5 is a flow diagram illustrating a method 501 of installing an electro-optical transceiver module into the socket assembly depicted in FIG. 1, in accordance with an embodiment FIGS. 6A, 6B, and 6C are isometric views illustrating an electro-optical module as it is installed into the socket assembly depicted in FIG. 1 following the method 501, in accordance with an embodiment. Referring first to FIG. 5, method 501 begins with receiving the module at operation 505, and if a shroud is affixed to the socket the shroud is removed. At operation 510, the module is positioned to have a leading edge declined from the trailing edge toward the PCB upon which the socket is disposed. At operation 520, the module is translated relative to the socket until the leading edge contacts the socket backstop overhang. FIG. 6A illustrates an exemplary embodiment, where a 4×25 Gbit/sec electro-optical transceiver module 200 has a leading edge 205 declined toward the PCB 100. Module 200 is translated following path 670 to position leading edge 205 under overhang top surface 130A.

Returning to FIG. 5, at operation 530, the module leading edge is inserted between the overhang and a socket body ramp to contact a socket body backstop surface(s) with center keyway 215 aligned with a center key in the socket body (149 in FIG. 3). Referring still to FIG. 6A, module 200 is inserted into socket 110 until leading edge notch 245 contacts chamfer surface 146 (e.g., depicted in FIG. 3). In embodiments where overhang includes, or is part of, a spring clip (for example including an under-hanging clip member) inserting the leading edge between the overhang and the socket body ramp strains the under-hanging clip member and/or clip relative to socket body 140. As shown in FIG. 6B, at this point in the module installation process, module 200 is substantially free standing with an inclination (declination) relative to the plane of PCB 100. Force applied by overhang 130 to a module substrate top surface 205 (FIG. 6A) is countered by the weight of cantilevered module 200.

Continuing with the description of FIG. 5, method 501 proceeds to operation 540 where the module is rotated about a fulcrum within the socket to bring the module trailing edge toward the PCB and contact first and second module pad rows to first and second socket contact rows. Operation 540 is further illustrated for the module 200 in FIG. 6B. As shown, a torque applied to the trailing edge, for example by a user's hand or a robotic installation tool, induces rotation about the axis A. This rotation brings module trailing edge 224 toward PCB 100 and retention anchor 120. In embodiments where overhang includes, or is part of, a spring clip, rotating the module about the fulcrum strains the spring clip. At operation 540 (FIG. 5), the torque is translated through module 200 as a lever force applied against overhang 130 with first and second module pad rows contacting corresponding first and second socket contact rows. At operation 550, contacts in the contact rows are compressed by rotation of the module. Referring to FIGS. 6B and 6C, upon reaching the appropriate load condition, latch 222A engages keeper 121A to maintain a predetermined load on the first and second contact rows. FIGS. 6B, 6C illustrate an optical I/O proximate to module trailing edge 224. An optical fiber may be coupled to module 200 before, during, or after any of the operations in method 501. As one example, an optical I/O may be plugged into module 200 after completion of method 501.

Completion of method 501 results in the optical transceiver assembly 601 depicted in FIG. 6C. The footprint on PCB 100 is only slightly larger than that of the transceiver module 200. Assembly 601 includes PCB 100, optical transceiver module 200 having an optical I/O (e.g., edge mounted) and an electrical I/O through a module socket. Assembly 601 further includes socket body 140 with a bottom side facing PCB 100 and a module backstop to receive a leading edge of the transceiver module, an overhang to contact a second side of transceiver module 200 when it is seated into the socket, and a first and second row of electrical contacts soldered to the PCB. Assembly 601 further includes a retention anchor disposed on PCB 100 to affix to the transceiver module.

Removal of a transceiver module may proceed by successively reversing the operations performed in method 501. For example, the module is released from the retention anchor and the trailing edge allowed to rotate up from the PCB. The module leading edge is the extracted from between the overhang and socket body.

Figure 7:
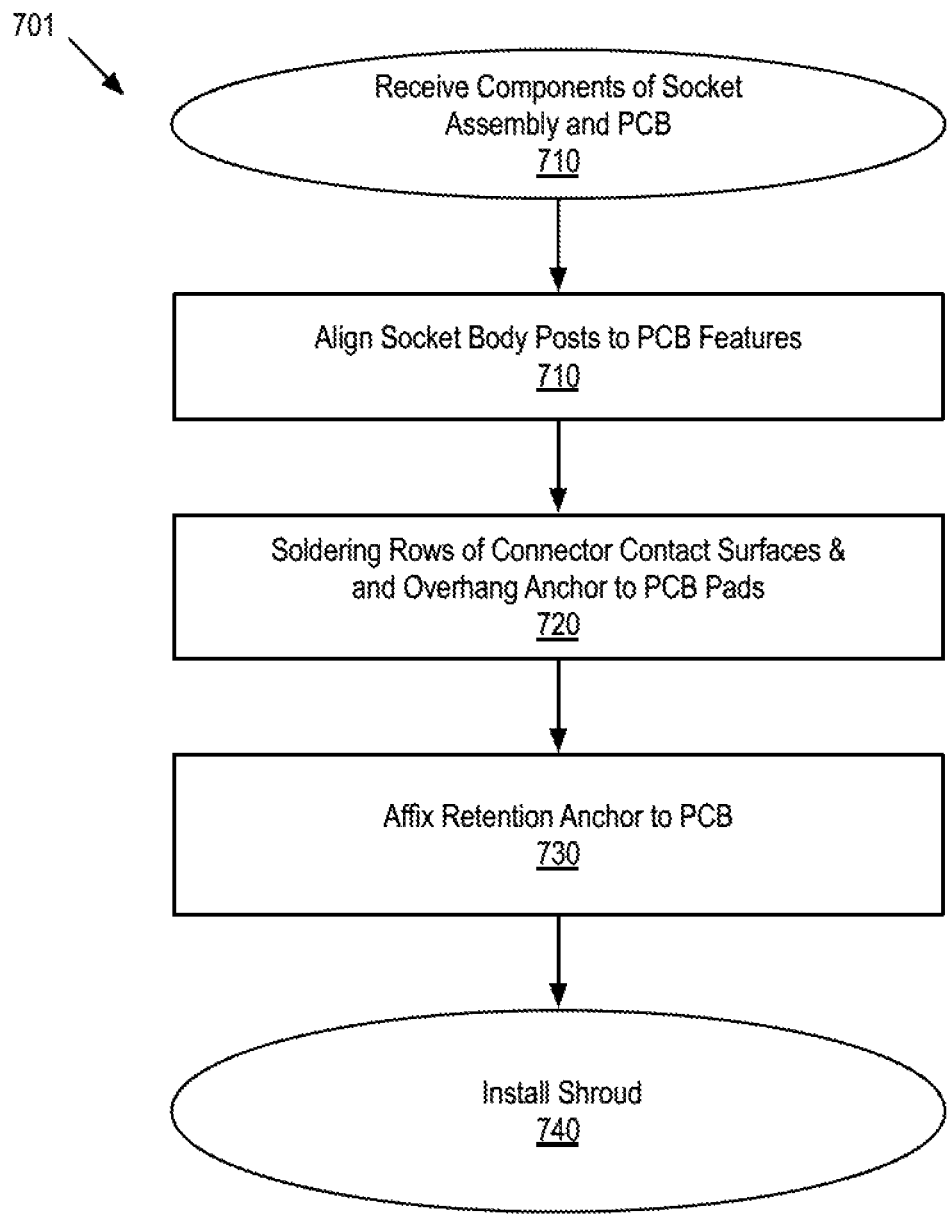
FIG. 7 is a method of mounting the socket assembly depicted in FIG. 1 to a PCB, in accordance with an embodiment.

FIG. 7 is a method 701 of assembling the socket assembly 101 to a PCB, in accordance with an embodiment. Method 701 begins with receiving components of a socket assembly and a PCB to which the socket assembly is to be mounted. In one exemplary embodiment, components of the socket assembly include socket body 140 with electrical contacts disposed therein, overhang 130, and retention anchor 120, as depicted in FIG. 1. The overhang may be first snap-fit into the socket body and, at operation 710, alignment posts in the socket body are positioned in alignment with receptive features disposed on the PCB. At operation 720, rows of contact contact surfaces and an overhang anchor point are soldered to pads on the PCB. While there are many suitable soldering techniques that may be employed, in one exemplary embodiment SMT is employed to concurrently bond all contact surfaces and one or mere overhang anchor point(s). At operation 730, a retention anchor is affixed to the PCB, for example by solder, press fit, screw, etc. Method 701 then completes with affixing a shroud to the socket body and/or overhang.

Figure 8:
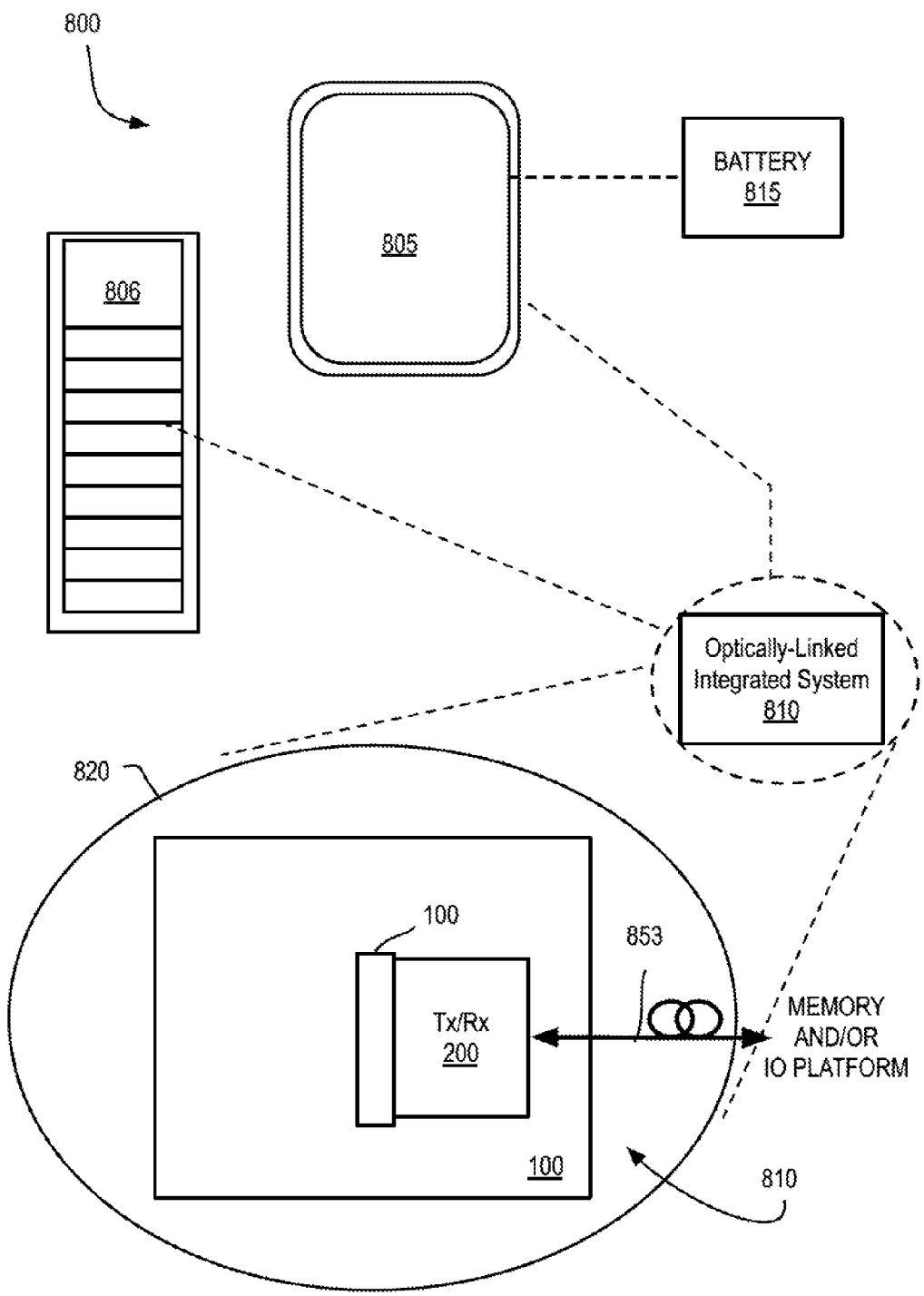
FIG. 8 is a block diagram of a system employing an electro-optical transceiver module coupled by the socket assembly depicted in FIG. 1, in accordance with an embodiment of the present invention.

FIG. 8 illustrates a system 800 in which a mobile computing platform 805 and/or a data server machine 806 employs an electro-optical transceiver module 200 socketed by socket assembly 101, in accordance with embodiments of the present invention. Server machine 806 may be any commercial server, for example including any number of high performance computing platforms disposed within a rack and networked together for electronic data processing, which in the exemplary embodiment includes optically-linked integrated system. Mobile computing platform 805 may be any portable module configured for each of electronic data display, electronic data processing, wireless electronic data transmission, or the like. For example, mobile computing platform 805 may be any of a tablet, a smart phone, laptop computer, etc., and may include a display screen (e.g., a capacitive, inductive, resistive, touch-screen), optically-linked integrated system, and battery 815.

Optical wire (i.e., fiber) 853 inputs one or more optical beam, fox example by top-side coupling or edge coupling into optically-linked integrated system. For the exemplary 4×25 Gbit/sec module, optical wire 853 comprises 4 fibers to transmit and 4 fibers to receive for a total 8 fibers. A plurality of optical waveguides may be disposed within a substrate of a transceiver chip within module 810. Such optical waveguides are each further coupled into a photo-detector, such as, but not limited to, a p-i-n photodiode, and/or coupled to laser emitters. The photodetector/lasers are in turn electrically coupled to downstream integrated circuitry, which may for example further include a voltage supply and sense/drive circuitry. In certain embodiments, voltage supply and sense/drive circuitry is implemented with CMOS transistors also disposed on a same silicon substrate implementing the waveguides. Electrical I/O from the sense/drive circuitry interfaces to the PCB 100 through contacts of socket assembly 101, for example as described in more detail elsewhere herein.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to particular exemplary embodiments.

In one embodiment, an integrated circuit (IC) module socket includes a socket body with a bottom side to face a printed circuit board (PCB), a backstop to laterally position a leading edge of an IC module substrate relative to the socket body, an overhang to contact a second side of the IC module substrate when the substrate is sealed on the socket body, and a first and a second row of electrical contacts. The first row is more proximate to the backstop than is the second row, and each row including at least one contact extends through the socket body between the top and bottom sides and is positioned relative to the overhang to be compressed against a contact pad disposed on a first side of the module substrate by a torque applied to the module substrate about a fulcrum within the socket.

In a further embodiment, electrical contacts in the first row further include PCB contact surfaces proximate to the backstop, and module substrate contact surfaces distal from the backstop. Electrical contacts in the second row further include PCB contact surfaces distal from the backstop, and module substrate contact surfaces proximate to the backstop.

In a further embodiment, electrical contacts in the first row are equally spaced with each contact further comprising a PCB contact surface proximate to the backstop and a module substrate contact surface distal from the backstop. Electrical contacts in the second row are arranged into a plurality of groups of three contacts with greater spacing between adjacent groups of contacts than between adjacent contacts within a group, with each contact further comprising a PCB contact surface distal from the backstop and a module substrate contact surface proximate to the backstop.

In a further embodiment, the overhang further comprises a metallic spring clip with an under-hanging clip member to contact the first module substrate side. The socket body further comprises a dielectric material with a ramp declining from a first ramp end nearer the contacts to a second ramp end nearer the backstop and spaced below the under-hanging clip member by a distance sufficient to accept the leading edge of the IC module substrate.

In a further embodiment, the overhang further comprises a plurality of metallic spring clips with under-hanging clip members across a transverse width of the overhang, each under-hanging clip member forming an acute angle with a top side of the overhang to contact the first module substrate side. The overhang further includes a solderable anchor point to be affixed to the PCB. The socket body comprises a dielectric material with a ramp surface approximately parallel to the under-hanging clip members, declining from a first ramp end proximate to the contacts to a second ramp end proximate to the backstop and spaced apart from the under-hanging clip member by a distance sufficient to accept the leading edge of the IC module substrate, and bosses to mate with complementary features in the overhang.

In a further embodiment, the backstop is monolithically integrated with the socket body and further comprises a first and second chamfer surface disposed at opposite ends of the socket body, extending laterally beyond the overhang, and radius about an axis parallel to a contact row, wherein the first chamfer surface is proximate a first contact in the first row and the second chamfer surface is proximate a last contact in the first row.

In a further embodiment, wherein the socket body further comprises a first and a second key or keyway disposed at opposite ends of the socket body, the first key or keyway proximate a first contact in the second row and the second key or keyway proximate a last contact in the second row, the keys or keyways to engage a complementary keyway or key in the module substrate when the module substrate is parallel to the PCB that prevents lateral displacement of the module substrate relative to the socket body.

In an embodiment, a socket assembly includes any of the socket embodiments described above and further including a retention anchor to be disposed on the PCB on a side of the electrical contact rows opposite the backstop, the anchor to affix to the IC module and to maintain an effort, applied through the IC module substrate, against the contacts and the overhang.

In an embodiment, a socket assembly includes any of the socket embodiments described above and further including a retention anchor to be disposed on the PCB on a side of the electrical contact rows opposite the backstop, the anchor to affix to the IC module at two points, or more.

In an embodiment, a socket assembly includes any of the socket embodiments described above and further including a retention anchor to be disposed on the PCB on a side of the electrical contact rows opposite the backstop, the anchor including a first latch or keeper proximate a first end of the socket body and a second latch or keeper proximate to a second end of the socket body, wherein the first and second latch or keeper is to mate with a complementary keeper or latch disposed on the IC module.

In an embodiment, an optical transceiver assembly includes a printed circuit board (PCB), an optical transceiver module comprising an optical I/O and an electrical I/O, and a module socket mechanically and electrically coupling the transceiver to the PCB. The socket further includes a socket body having a socket bottom side to face the PCB, a module backstop on a socket top side to receive a leading edge of the transceiver module, and an overhang to contact a second side of the transceiver module when the module is seated into the socket body. A first and second row of electrical contacts are soldered to the PCB with the first row being more proximate to the backstop than is the second row, and each row includes at least one contact extending through the socket body between the top and bottom sides and positioned relative to the overhang to be compressed against a contact pad disposed on a first side of the transceiver module by a load applied as the transceiver module rotates about a fulcrum within the socket. A retention anchor is disposed on the PCB on a side of the electrical contact rows opposite the backstop, the anchor to affix to the transceiver module and maintain an effort, applied through the transceiver module, against the spring load and the overhang.

In a further embodiment, the transceiver module supports one or more data rates of at least 25 Gbit/s over one or more of the contacts.

In a further embodiment of the transceiver module, electrical contacts in the first row are equally spaced with each contact further comprising a PCB contact surface proximate to the backstop and a module substrate contact surface distal from the backstop. Electrical contacts in the second row are arranged into a plurality of groups of three contacts with greater spacing between adjacent groups of contacts than between adjacent contacts within a group, with each contact further comprising a PCB contact surface distal from the backstop and a module substrate contact surface proximate to the backstop. The overhang further includes a plurality of metallic spring clips with under-hanging clip members across a transverse width of the overhang, each under-hanging clip member forming an acute angle with a top surface of the overhang to contact the first module substrate side. A solderable anchor point is present on the overhang to be affixed to the PCB. The socket body comprises a dielectric material with a ramp surface approximately parallel to the under-hanging clip members, declining from a first ramp end proximate to the contacts to a second ramp end proximate to the backstop and spaced apart from the under-hanging clip member by a distance sufficient to accept the leading edge of the IC module substrate, and bosses to mate with complementary features in the overhang.

In an embodiment, a method of loading an electro-optical transceiver module into a socket mounted on a PCB comprises receiving an IC Module, positioning the module to have a module leading edge declined from a trailing edge toward the PCB, inserting the leading edge between an overhang and a socket body ramp to contact socket body backstop, rotating the module about a fulcrum to bring the trailing edge toward the PCB and contact first and second module pad rows to first and second socket contact rows, and applying a lever force through the module against the overhang and compressing contacts in the first and second contact rows.

In a further embodiment, the method further includes anchoring the module to the PCB to maintain load on the first and second contact rows.

In a further embodiment, the method further includes anchoring the module to the PCB to maintain load on the first and second contact rows, wherein anchoring further comprises coupling a latch on one of the module and a retention anchor disposed on the PCB to a keeper on the other of the module and the retention anchor.

In a further embodiment where the overhang further comprises at least one metal clip including an under-hanging clip member forming an acute angle with a top surface of the overhang, the method further comprises inserting the leading edge between the overhang and the socket body ramp further comprises straining the under-hanging clip member, and applying the lever force further comprises rotating the module about the fulcrum.

In a further embodiment, the method further includes coupling an optical fiber to the module.

In an embodiment, a method of assembling an electro-optical transceiver module socket to a PCB includes aligning a feature on a bottom side of an electro-optical transceiver module socket body to a feature in a first region of the PCB, affixing the bottom side of the socket body to the PCB by soldering rows of electrical contact contacts and an overhang anchor to pads on the PCB, and affixing a retention anchor to a second region of the PCB.

In a further embodiment, the method of assembling an electro-optical transceiver module socket to a PCB further includes snap-fitting the overhang to the socket body, and affixing a shroud to the socket body.

In an embodiment, an integrated circuit (IC) module socket includes a socket body with a bottom side to face a printed circuit board (PCB), a first retention means on the socket body to laterally position a leading edge of an IC module substrate relative to the socket body, a second retention means on the socket body to contact a second side of the IC module substrate when the substrate is seated on the socket body, and a first and a second row of electrical contacts, the first row being more proximate to the first retention means than is the second row, and each row including at least one contact extending through the socket body between the top and bottom sides and positioned relative to the second retention means to be compressed against a contact pad disposed on a first side of the module substrate by a torque applied to the module substrate about a fulcrum within the socket.

In a further embodiment of the socket, the second retention means further comprises a metallic spring clip with an under-hanging clip member to contact the first module substrate side. The socket body further comprises a dielectric material with a ramp declining from a first ramp end nearer the contacts to a second ramp end nearer the first retention means and spaced below the under-hanging clip member by a distance sufficient to accept the leading edge of the IC module substrate.

In a further embodiment, the second retention means further comprises a plurality of metallic spring clips with under-hanging clip members across a transverse width of the overhang, each under-hanging clip member forming an acute angle with a top side of the second retention means to contact the first module substrate side; and a solderable anchor point to be affixed to the PCB. The socket body comprises a dielectric material with a ramp surface approximately parallel to the under-hanging clip members, declining from a first ramp end proximate to the contacts to a second ramp end proximate to the first retention means and spaced apart from the under-hanging clip member by a distance sufficient to accept the leading edge of the IC module substrate. Bosses in the socket body mate with complementary features in the second retention means.

In an embodiment, an optical transceiver assembly includes a printed circuit board (PCB), an optical transceiver module comprising an optical I/O and an electrical I/O, and a module socket mechanically and electrically coupling the transceiver to the PCB. The socket further comprises a socket body further including a socket bottom side to face the PCB, a first retention means on a socket top side to receive a leading edge of the transceiver module, and a second retention means to contact a second side of the transceiver module when the module is seated into the socket body. A first and second row of electrical contacts are soldered to the PCB, the first tow being more proximate to the first retention means than is the second row. Each row includes at least one contact extending through the socket body between the top and bottom sides and positioned relative to the second retention means to be compressed against a contact pad disposed on a first side of the transceiver module by a load applied as the transceiver module rotates about a fulcrum within the socket. A retention anchor is disposed on the PCB on a side of the electrical contact rows opposite the first retention means, the anchor to affix to the transceiver module and maintain an effort, applied through the transceiver module, against the spring load and the second retention means.

In a further embodiment, the electrical contacts in the first row are equally spaced with each contact further comprising a PCB contact surface proximate to the first retention means and a module substrate contact surface distal from the first retention means. Electrical contacts in the second row are arranged into a plurality of groups of three contacts with greater spacing between adjacent groups of contacts than between adjacent contacts within a group, with each contact further comprising a PCB contact surface distal from the first retention means and a module substrate contact surface proximate to the first retention means. The second retention means further comprises, a plurality of metallic spring clips with under-hanging clip members across a transverse width of the second retention means, each under-hanging clip member forming an acute angle with a top surface of the second retention means to contact the first module substrate side. The second retention means has a solderable anchor point to be affixed to the PCB. The socket body comprises a dielectric material with a ramp surface approximately parallel to the under-hanging clip members, declining from a first ramp end proximate to the contacts to a second ramp end proximate to the first retention means and spaced apart from the under-hanging clip member by a distance sufficient to accept the leading edge of the IC module substrate. Bosses in the socket body are to mate with complementary features in the second retention means.

It will be recognized that the invention is not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the invention should, therefore, be determined with reference to the appended claims, along with the full scope of equivalents to which such claims are entitled.

What is claimed is:

1. An integrated circuit (IC) module socket, comprising:
   a dielectric socket body with a bottom side to face a printed circuit board (PCB);
   a backstop monolithically integrated with the socket body to laterally position a leading edge of an IC module substrate relative to the socket body, the backstop further comprising at least three top-side supports defined by four reliefs, a pair of the reliefs defining opposite sides of a first support;
   a metal overhang positioned over the socket body top-side supports to contact a first side of the IC module substrate when the substrate is seated on the socket body, the overhang further comprising a plurality of spring clips, each with an under-hanging clip member aligned within one of the reliefs to contact the first module substrate side, with a pair of the clips separated from one another by a portion of the overhang that is positioned over the first support, and is separated from each of the clips by a relief in the overhang; and a first and a second row of electrical contacts, the first row being more proximate to the backstop than is the second row, and each row including at least one contact extending through the socket body between the bottom side and a top side, and positioned relative to the overhang to be compressed against a contact pad disposed on a second side of the module substrate by a torque applied to the module substrate about a fulcrum within the socket.

2. The socket of claim 1, wherein:
electrical contacts in the first row further comprise PCB contact surfaces proximate to the backstop, and module substrate contact surfaces distal from the backstop;
electrical contacts in the second row further comprise PCB contact surfaces distal from the backstop, and module substrate contact surfaces proximate to the backstop;
the overhang has a transverse width greater than that of the rows of electrical contacts; and
the under-hanging clip member to contact a significantly larger surface area than the electrical contacts.

3. The socket of claim 1, wherein:
electrical contacts in the first row are equally spaced with each contact further comprising a PCB contact surface proximate to the backstop and a module substrate contact surface distal from the backstop;
electrical contacts in the second row are arranged into a plurality of groups of three contacts with greater spacing between adjacent groups of contacts than between adjacent contacts within a group, with each contact further comprising a PCB contact surface distal from the backstop and a module substrate contact surface proximate to the backstop; and
the overhang has a transverse width greater than that of the rows of electrical contacts and further includes an overhang top side disposed against the socket body top side, and an overhang front side disposed against a front sidewall of the socket body.

4. The socket of claim 3, wherein:
the overhang further comprises a solderable anchor point to be affixed to the PCB; and
the overhang further comprises overhang top side regions disposed between the plurality of spring clips, the overhang top side regions to contact the top-side supports.

5. The socket of claim 1, wherein:
the plurality of metallic spring clips with under-hanging clip members are disposed across a transverse width of the overhang, each under-hanging clip member forming an acute angle with a top side region of the overhang to contact the first module substrate side;
the overhang has a transverse width greater than that of the rows of electrical contacts, and further comprises a solderable anchor point to be affixed to the PCB; and
the socket body comprises:
a ramp surface approximately parallel to the under-hanging clip members, declining from a first ramp end proximate to the contacts to a second ramp end proximate to the backstop and spaced apart from the under-hanging clip member by a distance sufficient to accept the leading edge of the IC module substrate.

6. The socket of claim 1, wherein the backstop further comprises a first and second chamfer surface disposed at opposite ends of the socket body, extending laterally beyond the overhang, and with a radius about an axis parallel to a contact row, wherein the first chamfer surface is proximate a first contact in the first row and the second chamfer surface is proximate a last contact in the first row.

7. The socket of claim 1, wherein the socket body further comprises a first and a second key or keyway disposed at opposite ends of the socket body, the first key or keyway proximate a first contact in the second row and the second key or keyway proximate a last contact in the second row, the keys or keyways to engage a complementary keyway or key in the module substrate when the module substrate is parallel to the PCB that prevents lateral displacement of the module substrate relative to the socket body.

8. A socket assembly, comprising:
the socket of claim 1; and
a retention anchor to be disposed on the PCB separate from the socket on a side of the electrical contact rows opposite the backstop, the anchor to affix to the IC module and to maintain an effort, applied through the IC module substrate, against the contacts and the overhang.

9. A socket, assembly, comprising:
the socket of claim 1; and
a retention anchor to be disposed on the PCB separate from the socket on a side of the electrical contact rows opposite the backstop, the anchor to affix to the IC module at two points, or more.

10. A socket assembly;
comprising:
the socket of claim 1; and
a retention anchor to be disposed on the PCB separate from the socket on a side of the electrical contact rows opposite the backstop, the anchor including a first latch or keeper proximate a first end of the socket body and a second latch or keeper proximate to a second end of the socket body, wherein the first and second latch or keeper is to mate with a complementary keeper or latch disposed on the IC module.

11. An optical transceiver assembly comprising:
a printed circuit board (PCB);
an optical transceiver module comprising an optical input/output (I/O) and an electrical I/O;
a module socket mechanically and electrically coupling the transceiver to the PCB, wherein the socket further comprises:
a monolithic dielectric socket body further comprising a socket bottom side to face the PCB, and a module backstop on a socket top side to receive a leading edge of the transceiver module, the backstop further comprising at least three top-side supports defined by four reliefs, a pair of the reliefs defining opposite sides of a first support;
a metal overhang positioned over to the socket body top-side supports, the overhang further comprising a plurality of metallic spring clips, each with an under-hanging clip member aligned within one of the reliefs to contact a first side of the transceiver module when the module is seated into the socket body, with a pair of the clips separated from one another by a portion of the overhang that is positioned over the first support, and is separated from each of the clips by a relief in the overhang;

a first and second row of electrical contacts soldered to the PCB, the first row being more proximate to the backstop than is the second row, and each row including at least one contact extending through the socket body between the top and bottom sides and positioned relative to the overhang to be compressed against a contact pad disposed on a second side of the transceiver module by a load applied against the spring clips as the transceiver module rotates about a fulcrum within the socket; and a retention anchor disposed on the PCB separate from the socket body on a side of the electrical contact rows opposite the backstop, the anchor to affix to the transceiver module and maintain an effort, applied through the transceiver module, against the spring load and the overhang.

12. The transceiver assembly of claim 11, wherein the second row of electrical contacts supports one or more data rates of at least 25 Gbit/s over one or more of the contacts.

13. The transceiver assembly of claim 12, wherein:

electrical contacts in the first row are equally spaced with each contact further comprising a PCB contact surface proximate to the backstop and a module substrate contact surface distal from the backstop; electrical contacts in the second row are arranged into a plurality of groups of three contacts with greater spacing between adjacent groups of contacts than between adjacent contacts within a group, with each contact further comprising a PCB contact surface distal from the backstop and a module substrate contact surface proximate to the backstop;

the plurality of metallic spring clips with under-hanging clip members are disposed across a transverse width of the overhang, each under-hanging clip member forming an acute angle with a top region of the overhang to contact a ground plane of the first module substrate side; and the overhang transverse width is greater than that of the rows of electrical contacts and further comprises a solderable anchor point to be affixed to the PCB; and the socket body comprises:

a dielectric material with a ramp surface approximately parallel to the under-hanging clip members, declining from a first ramp end proximate to the contacts to a second ramp end proximate to the backstop and spaced apart from the under-hanging clip member by a distance sufficient to accept the leading edge of the IC module substrate; and bosses to mate with complementary features in the overhang.

14. A method of assembling an electro-optical transceiver module socket to a printed circuit board (PCB), the method comprising:

aligning a feature on a bottom side of an electro-optical transceiver module socket body to a feature in a first region of the PCB, the socket body being a dielectric and including a backstop to laterally position a leading edge of a transceiver module substrate relative to the socket body, the backstop further comprising at least three top-side supports defined by four reliefs, a pair of the reliefs defining opposite sides of a first support;

affixing the bottom side of the socket body to the PCB by soldering rows of electrical contacts affixing an anchor of a metal overhang to pads on the PCB, the overhang positioned over socket body top-side supports and further comprising a plurality of spring clips, each with an under-hanging clip member aligned within one of the reliefs to contact a first side of an integrated circuit module substrate, a pair of the clips separated from one another by a portion of the overhang that is positioned over the first support, and is separated from each of the clips by a relief in the overhang; and affixing a retention anchor to a second region of the PCB separate from the socket on a side of the electrical contacts opposite the backstop, the anchor to affix to the transceiver module and to maintain an effort, applied through the transceiver module substrate, against the contacts and the overhang.

15. The method of claim 14, further comprising:

snap-fitting the overhang to the socket body, the overhang having a transverse width greater than that of the rows of electrical contacts; and affixing a shroud to the socket body.

16. The socket of claim 1, wherein a leading edge of the top-side supports is substantially flush with a leading edge of the portion of the overhang between the clips.

* * * * *